United States Patent [19]

Anselm

[11] 4,035,950
[45] July 19, 1977

[54] CHANNEL-LIKE STRUCTURE FOR HORTICULTURE AND FLOWER-GROWING

[76] Inventor: Anthony Cesar Anselm, Casa Clarita, Molcote, Lugano, Switzerland

[21] Appl. No.: 662,046

[22] Filed: Feb. 27, 1976

[30] Foreign Application Priority Data

Feb. 27, 1975 Italy .................................. 20746/75
Oct. 10, 1975 Italy .................................. 28169/75

[51] Int. Cl.² .......................................... A01G 31/00
[52] U.S. Cl. ......................................... 47/59; 47/39; 47/67; 47/87
[58] Field of Search ................... 47/1.2, 34, 34.13, 38, 47/39

[56] References Cited

U.S. PATENT DOCUMENTS

| | | | |
|---|---|---|---|
| 2,713,749 | 7/1955 | Hult | 47/1.2 |
| 2,807,912 | 10/1957 | Bjorksten | 47/1.2 X |
| 3,006,818 | 10/1961 | Lappala et al. | 47/1.2 X |
| 3,352,057 | 11/1967 | Ferrand | 47/1.2 |
| 3,365,840 | 1/1968 | Cooper | 47/1.2 X |
| 3,667,157 | 6/1972 | Longhini | 47/1.2 |
| 3,868,787 | 3/1975 | Wong | 47/1.2 |
| 3,872,621 | 3/1975 | Greenbaum | 47/1.2 |

FOREIGN PATENT DOCUMENTS 28,527 9/1970 Japan ..................................... 47/1.2

Primary Examiner—Robert E. Bagwill
Attorney, Agent, or Firm—Diller, Brown, Ramik & Wight

[57] ABSTRACT

In a tubular system for hydroponic culture, the improvement consisting in that the channel structure comprises a central core of a comparatively stiff plastics material and the sidewalls are made of a comparatively pliable plastics material, the upper edges of the sidewalls being capable of being at least partially juxtaposed. A further important improvement consists in that the surface of the bottom wall of the central core is lined with a fibrous material which offers a grasp for the seedling roots.

28 Claims, 28 Drawing Figures

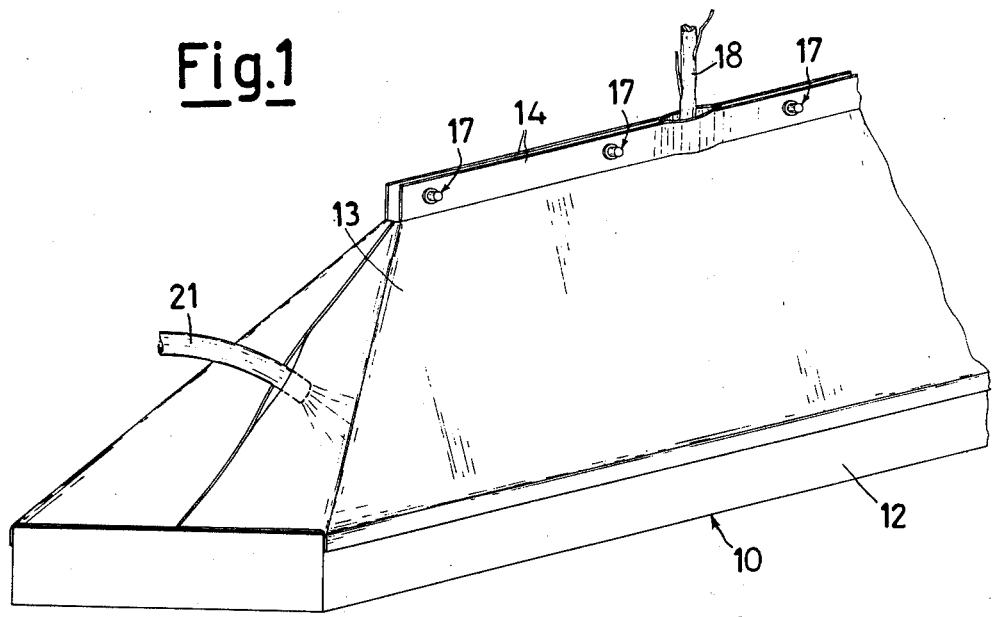
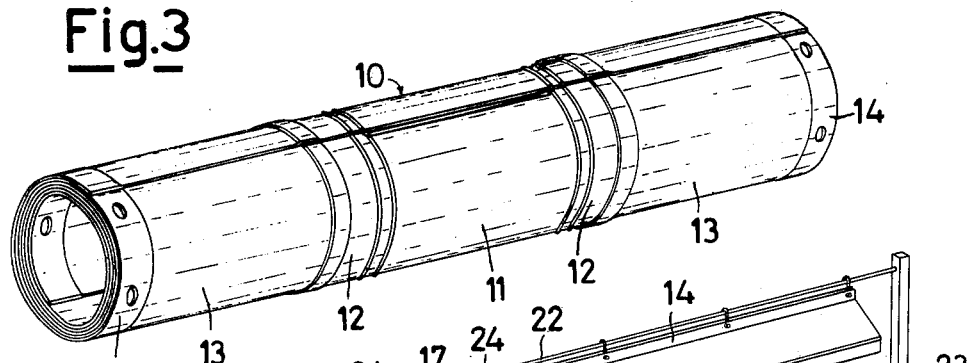
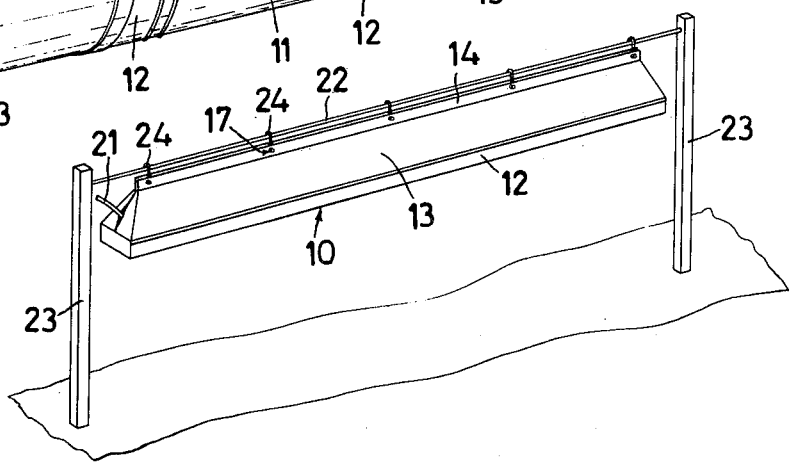

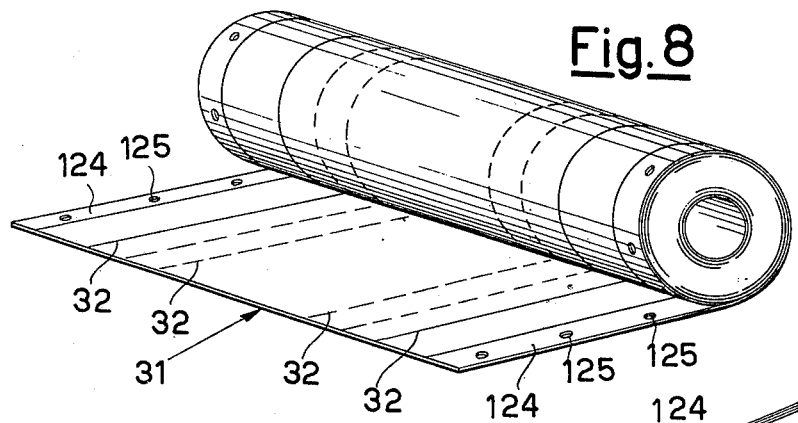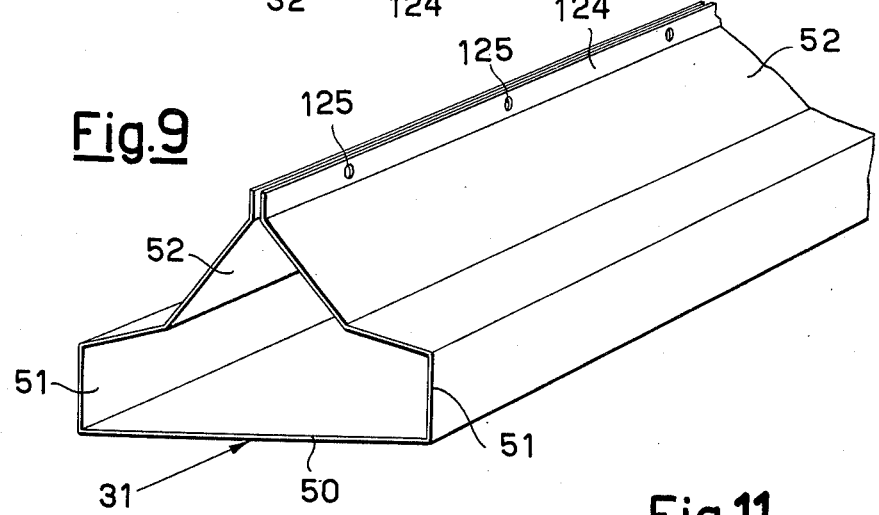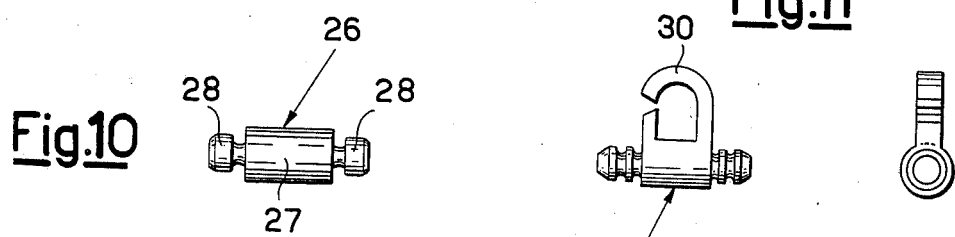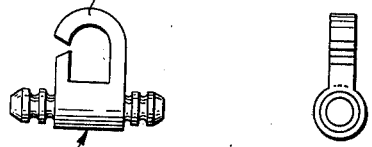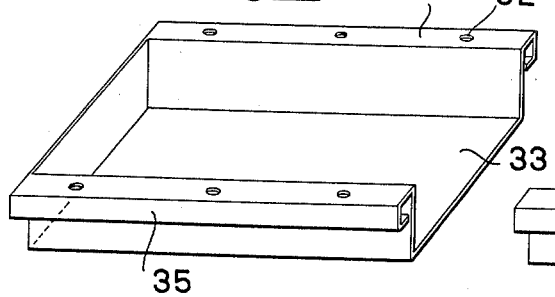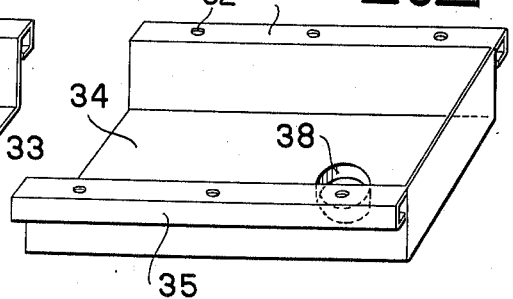

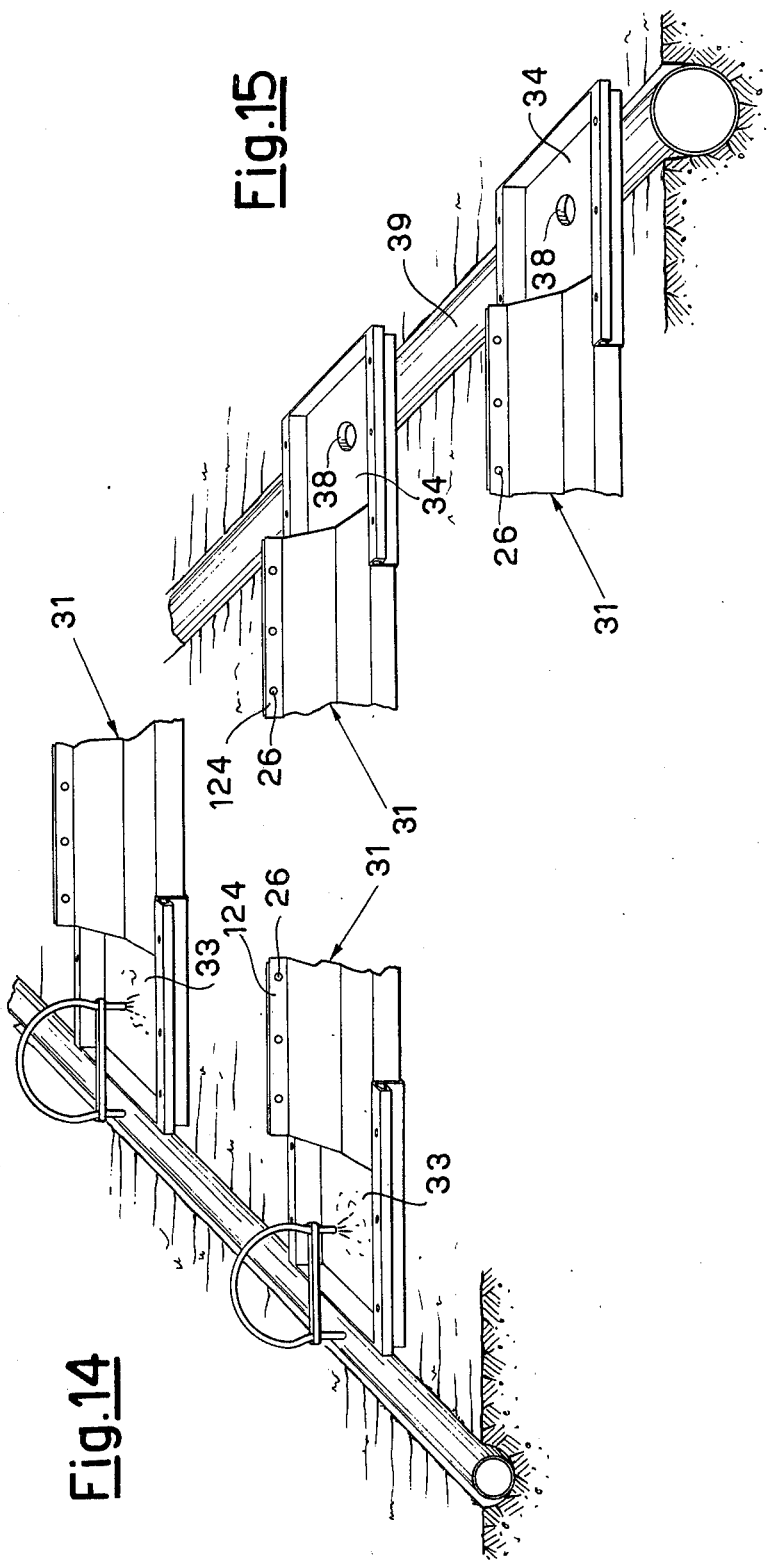

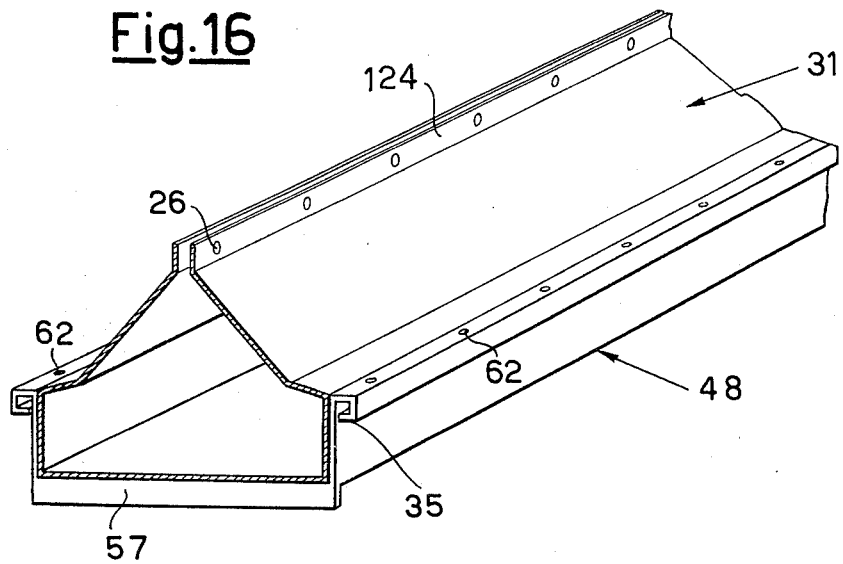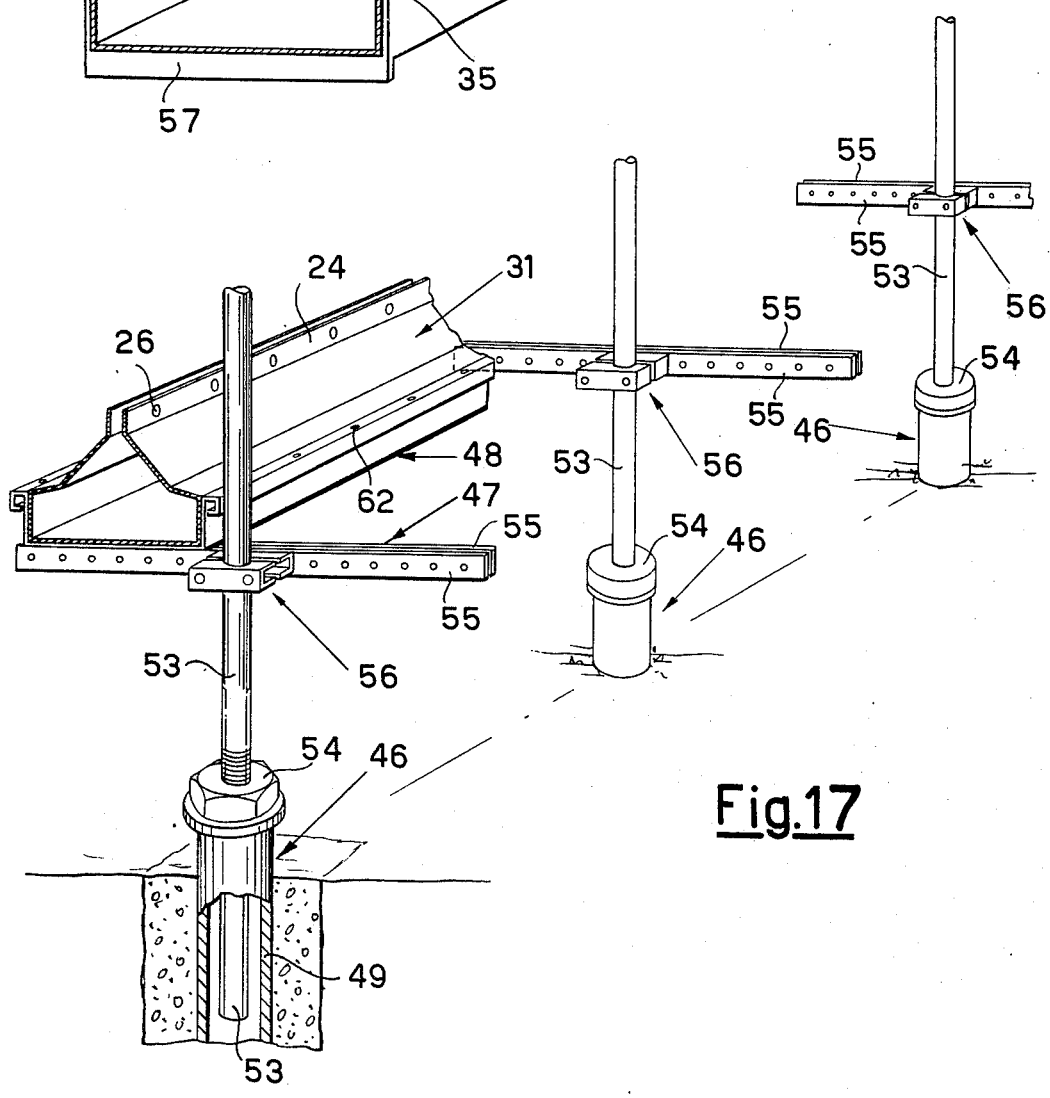

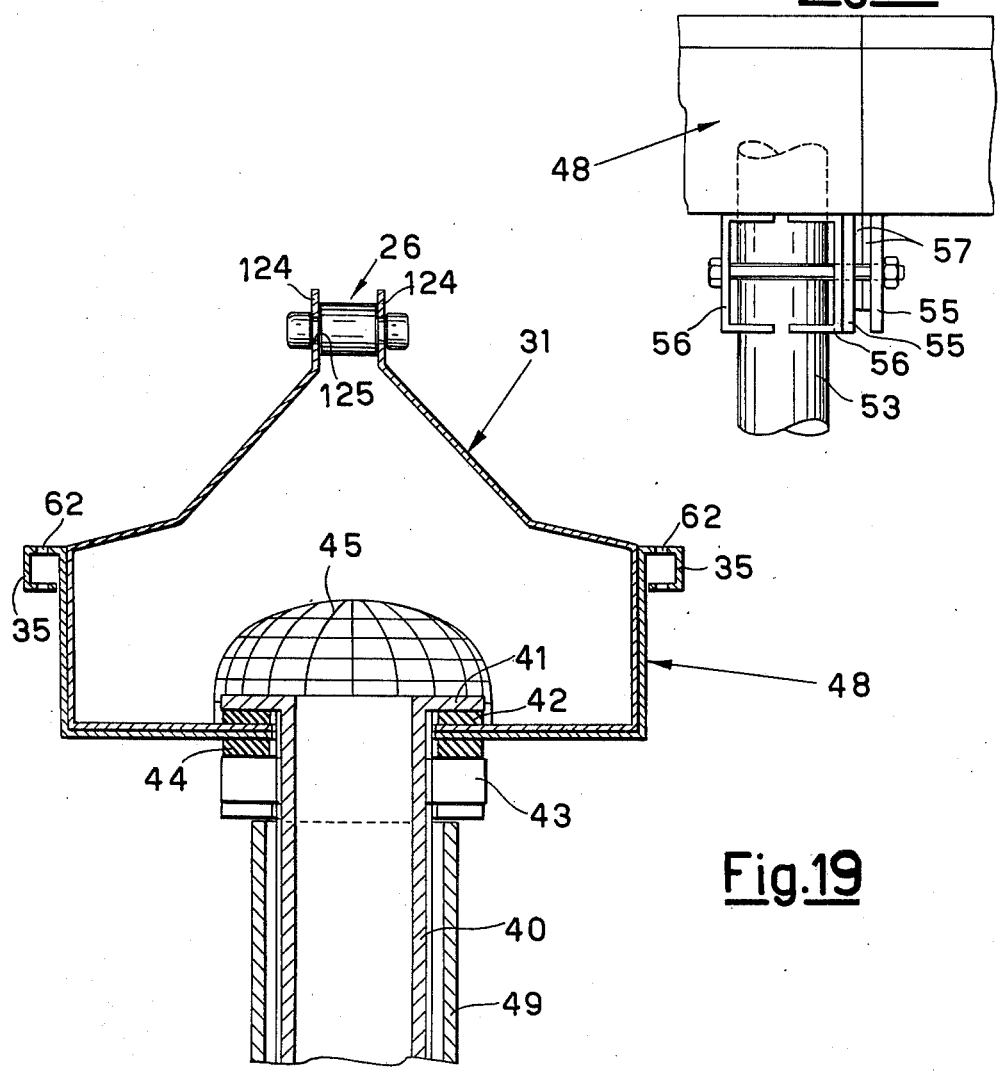

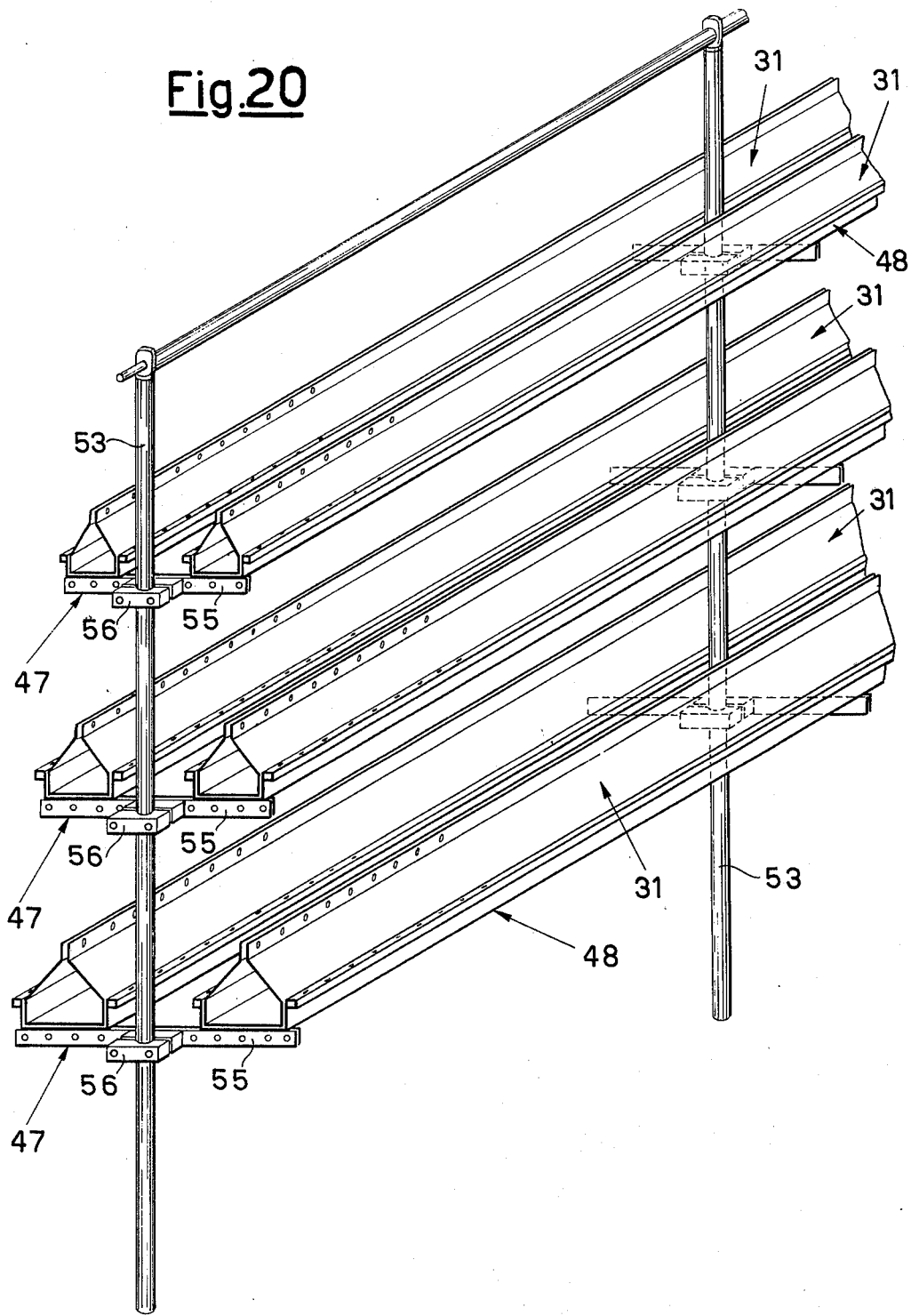

CHANNEL-LIKE STRUCTURE FOR HORTICULTURE AND FLOWER-GROWING

This invention relates to a channel-like structure which is useful for plant growing in a liquid nutrient.

In addition to the conventional methods of plant growing in earth, the so-called hydroponic culturing methods have received a wide acceptance, these methods being adapted for market-gardening or flower plants, in which the plants are grown on a sterile substrate which is kept in contact (for example by periodical watering) with a solution which contains the nutrients that the plant would naturally draw from the soil.

Besides the hydroponic cultures proper, also methods of culturing in a liquid medium have been developed, according to which the plant roots are directly immersed in the liquor which contains the desired nutrients. These methods which were inspired to what in some cases naturally occurs, have subsequently been developed by resorting to tubular channels of plastics material films in the interior of which the seedlings are arranged by removably fastening the stem or stalk to the adjoining portions of the tubular plastics material, in the interior of which the liquid nutrient solution is caused continually to flow.

Such an approach, however, originates in its reduction to practice, several problems and drawbacks, which can be briefly summarized as follows.

1. The tubular film is easily damaged either by naturally occurring rough spots in the soil or by careless handling.
2. On account of the smoothness of the plastics material film it becomes a problem to maintain the seedlings in the preselected postures and in the erected position, since the natural anchoring of the roots to the plastics material surface is questionable.
3. Ventilation problems arise, especially on account of the rather frequent formation of gas pockets, especially ethylene pockets, which remain occulded in the film folds.
4. If the plastics material film is opaque or, in limiting conditions, black, in order to shelter the seedlings from the sun rays, especially ultraviolet radiations, the periodical inspection of the seedlings becomes difficult.

An object of the present invention is to solve the problems and to remedy to the defects briefly outlined above.

Such an object is advantageously achieved according to the present invention by means of a continuous channel-like structure of the kind in which the seedlings to be grown are arranged at regular intervals in such a way that the rootlest are in continuous contact with a liquid nutrient solution flowing in the interior of the structure, the solution being fed at either structure end and discharged at the opposite end, the structure being characterized in that it is constituted by a central core of a plastics material adapted to provide in use a channel-shaped member, and two side strips of a nonrigid plastics material starting from the edges of said central core, the side strips having such a width as to be able to be at least partially superposed to one another in correspondence with the center line of said channel-shaped member, the inner surface of said central core which is the bottom wall of the structure being lined by a layer of a fibrous material.

According to a first embodiment, the channel-like structure according to the present invention, provides that the central core is made in the form of a strip of a semirigid strip of a plastics material, having longitudinal fold lines adapted to enable the strip to be converted for use into a channel, and that along each longitudinal edge of said strip a strip of a film of plastics material is affixed, which has a coefficient of linear expansion near to that of the plastics material of the core, the former strip being preferably opaque and such as to stop ultraviolet radiations, the outer edges of the two strips of plastics film being adapted to be united together, preferably at preselected intervals, by means of removable clamps, while allowing between two consecutive clamps an opening for passing the stem and/or the leaves of the seedling therethrough and to establish a communication with the outside atmosphere which is such as to provide an adequate degree of ventilation for the interior of the channel-like structure.

In a few cases, to the general problems outlined above, requirements and problems are added which are posed by specific practically occurring situations, namely:

a. In a few applications, the channel-like structure undergoes very wide temperature differentials which may originate both deformations and misalignments, especially in correspondence with the junctions between the side strips and the cental core, said junctions, in addition, being a weak point in the commercial production of the structure.

b. The channel-like structure is intended for an exploitation which spans a number of production cycles (in the order of a few years), a fact which involves the restoration of the structure once the cycle has been completed and the plants have been withdrawn from the channel-like structure and, above all, the purging of the inner surface of the structure from root residues and other debris once the plants have been removed.

c. In a few applications, the channel-like structure is hung by means of hooks to cables stretched between posts or the structure is associated to other stiff supporting members. To reduce the latter embodiment to practice, which is an asset especially when bulk problems exist or there are requirements as to a plant growing along compact and closely arranged rows, it would be required in practice that the core portion of the channel-like structure is considerably stiffened, so that the above outlined defects would not only be exalted but problems would arise as to the storage of structure and its transportation to the place of use (inasmuch as the structure could not be wound in coils any longer) and as to the sealtight union of adjoining sections of the same structure.

According to a second embodiment of the present invention, a channel-like structure is provided, which is useful for the purposes enumerated hereinabove and is characterized in that it comprises a tubular member of a plastics material open along a generating line, the tubular member having at least a crease on two opposite sides, intended to provide both the flank and the side strips of the channel-like structure, the borders of the longitudinal cut indicated above having holes which match each other and are marshalled according to a preselected pattern along the length of said borders.

An additional aspect of the present invention is to provide terminal means by which the ends of channel-like sections can be put in communication with other sections or with nutrient solution collection means.

A further aspect of the present invention is to provide means for the formation of row-like structures and especially supporting means for the channel-like structure.

The particular aspects and advantages of the present invention will become apparent from the ensuing detailed description of embodiments of the invention, given with reference to the accompanying drawings, wherein:

FIG. 1 is a perspective view from the outside of the structure according to the present invention.

FIG. 3 is a view of the channel-like structure prior to its being assembled.

FIG. 4 is a diagrammatical view of an alternative embodiment.

FIGS. 8 and 9 are views of another embodiment of the channel-like structure of this invention.

FIGS. 10 and 11 are side elevational views of members for the junctions of the free borders of the channel-like structure.

FIGS. 12 and 13 are views of stiff terminal members for the channel-like structure shown in FIG. 9.

FIGS. 14 and 15 show the structure of this invention as employed laying on the ground.

FIG. 16 is a view, partly in cross-section, of a stiff component part, more particularly a metallic one, shaped as a supporting channel for the channel-like structure.

FIGS. 17 and 18 are views of a system in which the channel-like structure is supported at a low level above the ground.

FIG. 19 is a cross-sectional view of a device for discharging the liquid nutrient solution from a channel-like structure.

FIG. 20 diagrammatically shows a twin-row cultivating system.

FIGS. 21, 22, 23, 24 and 25 are views of further alternative embodiments of modes of use of the channel-like structure according to this invention.

Figure 26:
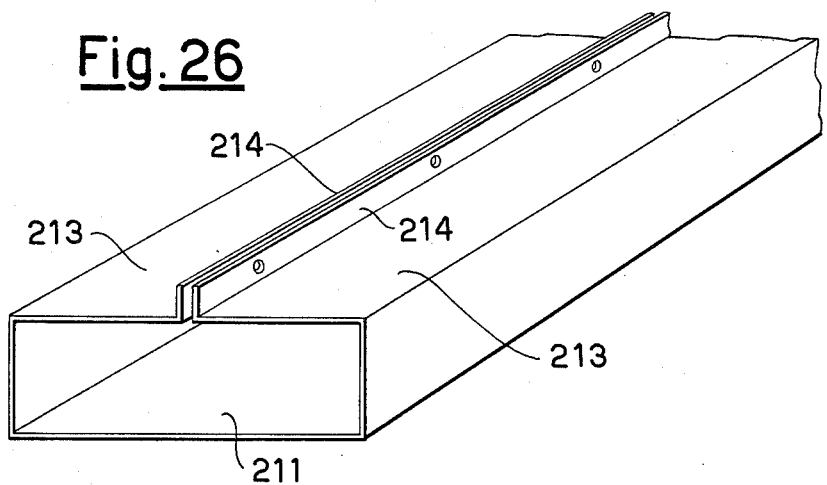
Figure 27:
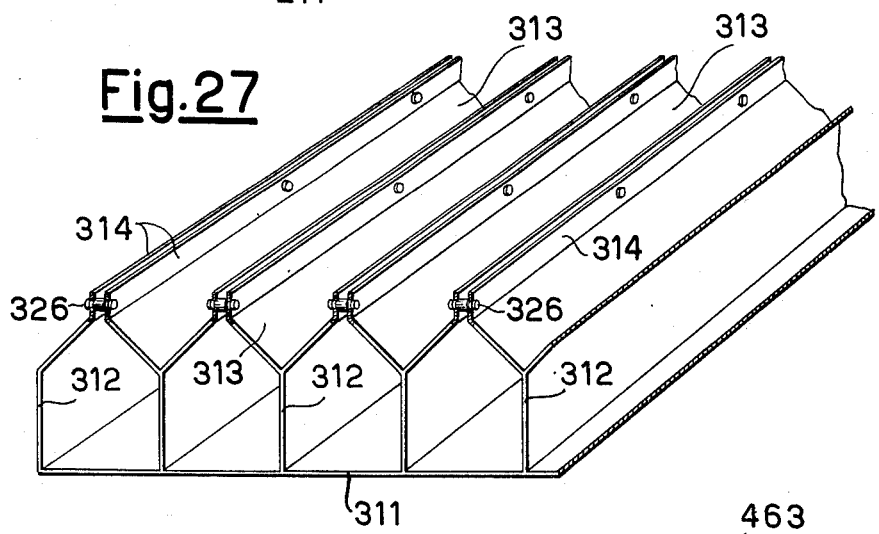
Figure 28:
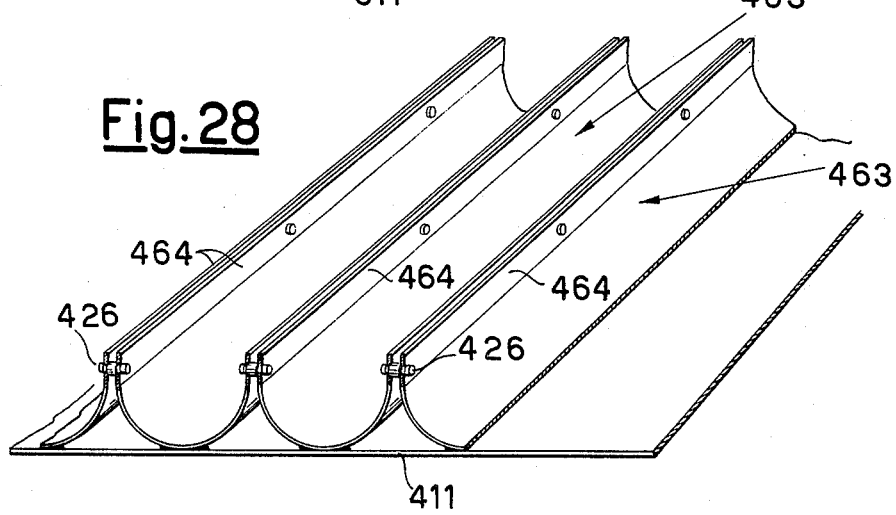

FIG. 26 is a cross-sectional view of yet another embodiment of the structure according to the present invention, and FIGS. 27 and 28 are diagrammatical views of still another embodiment of the plural-channel type.

Figure 2:
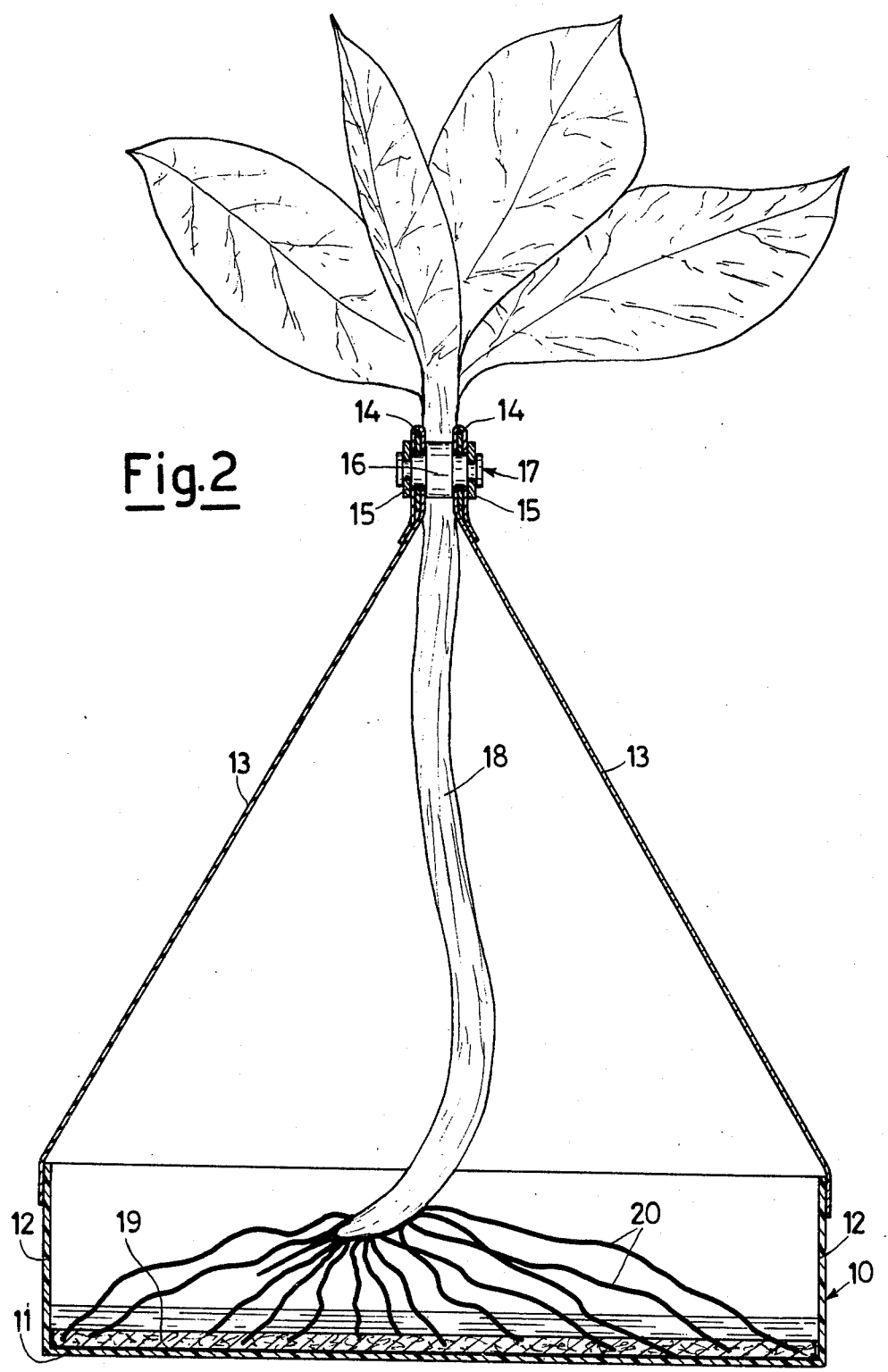
FIG. 2 is a cross-sectional view of the structure of FIG. 1 taken along a plane perpendicular to the longitudinal axis of the structure.

With reference to FIGS. 1 to 3, the channel-like structure 10 comprises a rigid or semirigid core 10 forming a channel-shaped member and composed by a bottom wall 11 and sidewalls 12.

Along the outer edges of the sidewalls 12 are fastened respective strips 13 of a pliable plastics material, preferably polyethylene film, the outer edges of which, as preferably reinforced by an appropriate crease 14 are adapted to be united to one another, at preselected intervals, by the agency of removable clamps 17. The latter, in the example shown, comprise a member 16 which is so shaped as to receive, while keeping them spaced from one another, the two folded edges 14 of the strips 13 and two widened end portions 15 for locking the clamp in position. As an alternative, the two edges can be equipped with magnetic component parts which cooperate to provide a spot junction.

Be it anyhow understood that the union of the two folded edges can be obtained by any removable type of latch or clamp.

As clearly shown in FIG. 1, the stem 18 of the plant is passed through the opening as provided between two consecutive clamps, the plant being freely allowed regularly to grow.

The inner surface of the bottom wall 1 of the core 10 is lined by a layer 19 of a fibrous material, preferably felt or an unwoven fabric, having two principal functions; namely;

a. To encourage the grasp of the roots 20 of the plant in the desired position.

b. To ensure, by capillary action, that the plant roots are constantly in contact, in the measure which is necessary for the expected grow of the plant, with the nutrient solution.

Such a fibrous material can initially be laminated to the bottom wall of the channel-like structure.

As clearly shown in FIG. 3, the structure according to the present invention lends itself to be manufactured in the form of rolls or coils which, as it is to be installed, is merely unrolled and cut in the desired section lengths.

At this stage, that which is an additional practical advantage of the structure according to the present invention, it suffices to cut at either end of the structure a portion of the sidewalls 12 and fold upwards (in a box-like configuration) the bottom wall 11 which is thus left, whereas the corresponding portions of the strips 13 are either folded or cut so as to provide an end closure through which a pipe 21 is caused to pass for feeding the nutrient solution in.

In an alternative embodiment, which is especially suitable when the structure according to the present invention is to be installed outdoors, the strips 13 can either be lined, or replaced, by a heat-insulation material, such as an expanded material.

In addition to the possibility of periodically checking the plants being grown, the clamp system 17 permits, on completion of a preselected growing period, conveniently to withdraw the plants.

In order to restore the efficiency of the structure, it is enough, possibly, to substitute the felt layer 19, should it have been partially removed with the plants, to introduce the seeds or the new seedlings and to apply the clamps once again.

Obviously, the plants to be grown could be both arranged as shown in FIG. 2, or introduced as they are already in a pot: if so, the side strips 13 can directly be clamped to the pot edges. Preferably, however, the seedlings, as they normally come from a nursery, are introduced with their roots enclosed in a block or cube of coherent material, preferably rock-wool.

According to a further embodiment, on completion of the growing period, it is possible to cut the structure into a number of sections, as many as there are plants, to close in the manner outlined above the severed ends, thus forming a sort of boxes for containing the individual plants, the latter being thus enabled to stay in the same medium wherein it had been grown. This is especially true of flowers and ornamental plants.

As outlined above, the central core 10 of the structure according to the present invention is made of a semirigid plastics material, preferably a thermoplastic one, more particularly polyvinyl chloride, polyethylene, polypropylene and the like, and is conveniently manufactured by extrusion and preferably already fitted with the longitudinal creases. As regards the strips of sheet material 13, thermoplastic materials are preferably adapted, and, more particularly, polyethylene strips have proven especially suitable, of a black colour in order to prevent ultraviolet radiations to pass therethrough: as regards the union of the component parts to each other there is no problem inasmuch as a simple welding is what is required and can rapidly be performed.

It is likewise apparent that the structure according to the present invention is endowed with a considerable resistance to the damages which are caused by soil roughness, boulders or careless handling.

Lastly, it is also possible to associate to the clamps ancilliary members for supporting the plants.

In those cases where a ventilation increase is desirable, appropriate holes can be formed through the side strips 13.

In the embodiment shown in FIG. 4, the channel-like structure is hung by means of hooks 24 to a cable 22, the latter being held taut between two posts 23, a row cultivation thus becoming practicable.

Figure 5:
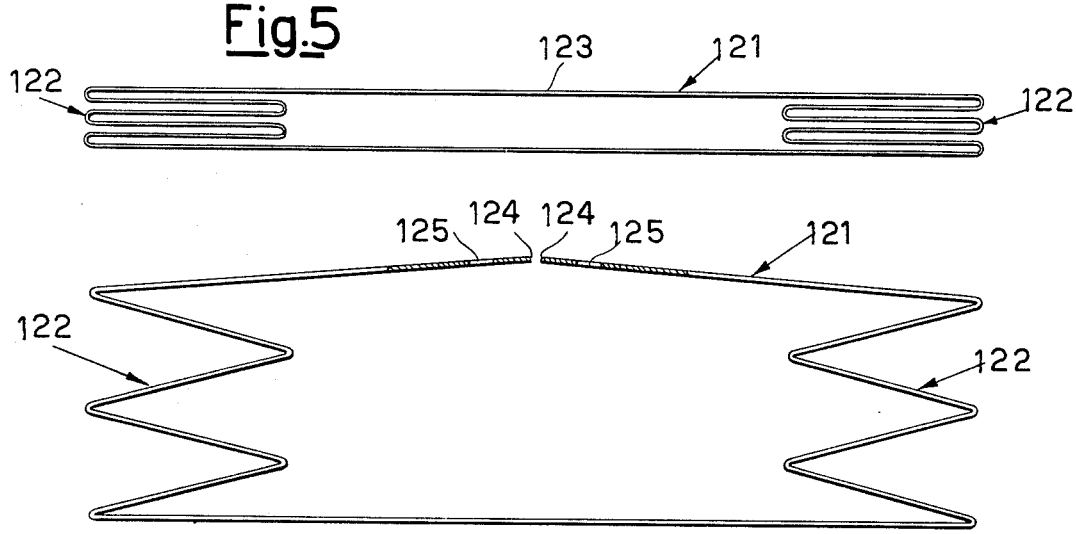
FIGS. 5, 6 and 7 are views of the first embodiment of the channel-like structure of this invention as it comes out of the factory and in the position of use, respectively.
Figure 6:
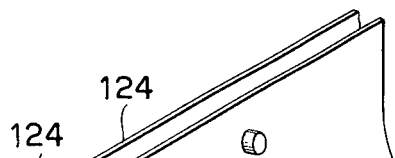
Figure 7:
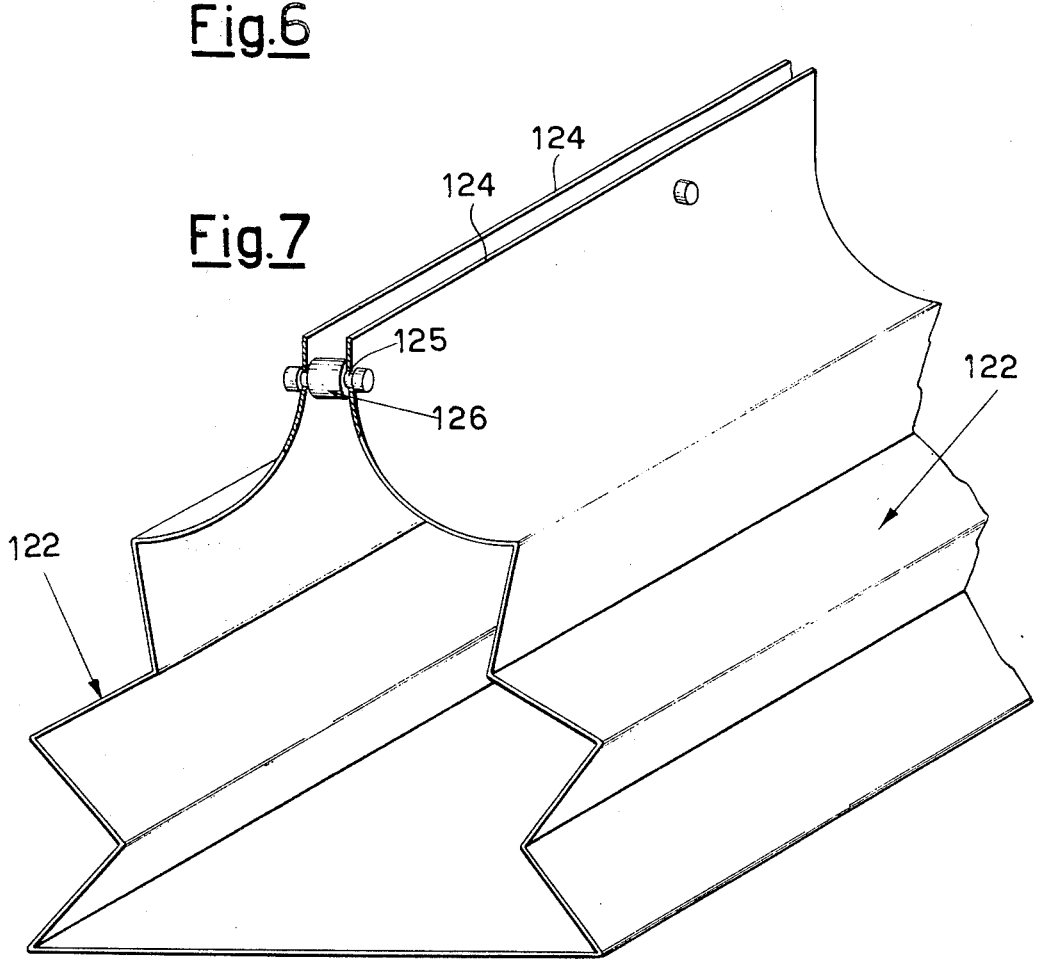

Having now reference to FIGS. 5 to 7, a second embodiment is shown of the channel-like structure according to the present invention, consisting of a tubular member 121, which is preferably obtained by extrusion from a plastics material which has the appropriate robustness and has a certain stiffness. More particularly, it is extruded from polyvinyl chloride, polyethylene or polypropylene, and preferably has its outside a surface which is adapted to reflect the sunrays so as to prevent an undesirable overheating of the inner hollow.

On the two opposite sides of the tubular member a twin-folding 122 is provided, whereas, in correspondence with the central line of the upper base 123 a longitudinal cut is made, that is a cut parallel to the generating line of the tubular member and which preferably extends along the entire length of said member, thus providing the edges 124 through which union holes 125 are formed.

The conditions of use of the channel-like structure as defined immediately above is clearly seen in FIG. 7, wherein the function of the folds 122 is also clearly apparent, the latter contributing not only towards maintaining the desired shape of the channel-like structure, but also towards displaying a bellows-like resilient function.

For uniting the two edges 124 it is possible both to use the members 26 (FIG. 10), each of which comprises a central spreader body 27 and two end flanges 28, or the members 29 (FIG. 11) which differ from the members 26 in that the central body has a hooked portion 30 for hanging the channel-like structure to appropriate cables or supporting members (FIG. 4).

In the embodiment shown in FIG. 8, the channel-like structure is composed by a strip 31, on which appropriate preselected folding lines 32 have been provided, along with the holes 125, so that the strip 31 makes up the channel-like structure as shown in FIG. 9: in the structure there can be seen a rest base 50, two sidewalls 51 and two side strips 52, the latter being terminated by the free edges 24 through which the holes 25 are formed. Of course, the structure 31 could be manufactured in the same way as that of FIGS. 4 to 7, by using a tubular component and forming a simple creasing.

It should be emphasized that also the strip 31 is made of a plastics material endowed with the appropriate properties as to mechanical robustness and sufficient stiffness. Preferably, the strip 31 is made by uniting two sheets of a plastics material of different colours which are laminated together with the methods which are conventional in the plastics material field.

FIGS. 12 and 13 show two terminals, respectively indicated at 33 and 34, which are intended for mounting at the two ends of the channel-like structure, such as shown in FIGS. 14 and 15.

The terminal 33, made of sheet metal or a rigid plastics material has the shape of a box which is closed on three sides, whereas the channel-like structure shown in FIG. 9 is extended through the fourth side. The two side edges of the terminal 33 are curled both downwards and inwards, so as to provide two boxlike open ridges 35. The boxlike ridges 35, in addition to provide a stiffening action, can also be exploited for uniting the structure to other sections of rigid channels 48 (FIG. 16), the latter supporting the channel-like structure by the agency of pins inserted in adjoining ridges. The terminal 34, in its turn, which is wholly akin to the member 33, has a hole 38, through which the discharge of the nutrient solution to another channel-like structure may take place, or, as shown in FIG. 15, the discharge to a collecting manifold 39.

Instead of the terminals 33 and 34, a different approach is suggested, according to which, by folding the base of the channel-like structure upwards in the same as for the packaging boxes, the hollow space of the same structure is closed at both ends, whereas for discharging the nutrient solution the approach shown in FIG. 19 is suggested, according to which a screw-threaded pipe 40, having at the top end a flange 41, is inserted in a hole formed through the base of the channel-like structure and possibly also through the metallic supporting channel, care being taken to insert between the flange and the inner surface of the base face 50 of the channel-like structure a gasket 42 made of an expanded pliable material.

In order to lock the discharge tube or fitting 40, a nut 43 is provided, a rubber gasket 44 being inserted therebetween.

To prevent any obstruction or clogging of the discharge fitting, a protection grid 45 is provided, having preferably a dome shape and an appropriate height, so as to ensure the flow of the nutrient solution even though debris and loam may collect at the grid base and on the bottom meshes. The fastening of the grid to the discharge fitting takes place, for example, by means of two or more feet which are resiliently engaged in the sink hole.

In a few cases the necessity arises of supporting the channel-like structure at a small level overhead, for example due to the occurrence of ground irregularities and/or rough spots susceptible of damaging the structure.

Resort is had then to the system shown in FIGS. 17 and 18, in which composite supporting members 46 are thrust in the ground at regular intervals and are equipped with cross-arms 47, on which supporting channels 48 (FIG. 16) are supported.

More particularly, the composite supporting member comprises a pipe section 49 driven into the ground, and in the interior of this pipe is seated, in an at least partially freely slidable manner, a screw-threaded bar 53, the height of which from the ground is adjusted by means of a nut 54, the latter being screwed onto the bar and resting against the mouth of the pipe 49.

Each arm 47 comprises two equal bars 55 united together by screws and affixed, moreover, to the bar 53 by means of a sleeve which is made up by two half-shells 56 encompassing the bar 53.

As clearly shown in FIG. 18, the ends of the metal channels 48 intended for supporting the channel-like structure are engaged and held on the arms 47 and more particularly in the slot which is left between the two bars 55, by means of an extension 57 which projects downwards from the end of the channel 48.

FIG. 16 clearly shows how the channel 48 is composed by a body portion which is shaped just as the two terminals 33 and 34 and the extension 57 aforementioned. Of course, the supporting members 46 will be appropriately spread apart correspondingly to a standard length of sections of the supporting channel 48: these sections correspond to sections of the same length of the channel-like structure proper, in which the plants to be grown are seated.

It is understood, furthermore, that the system of FIG. 17 is but an example and that other embodiments can be devised while remaining within the scope of the invention. However, this system affords the twofold advantage of permitting the staggering of the supporting arms, in order to impart to the supporting channels and thus also to the channel-like structures an even slight slope which encourages the flow of the nutrient solution while concurrently allowing the supporting channels to be horizontally shifted along the slots of the supporting arms.

FIG. 20 shows an example of the growing system in rows, in which the channel-like structures are supported on a numbers of tiers which are vertically spaced apart to such a degree as not to hinder the plant growth.

Also in this case the supporting members and the supporting arms can have the same configuration as shown in FIGS. 17 and 18.

Figure 21:
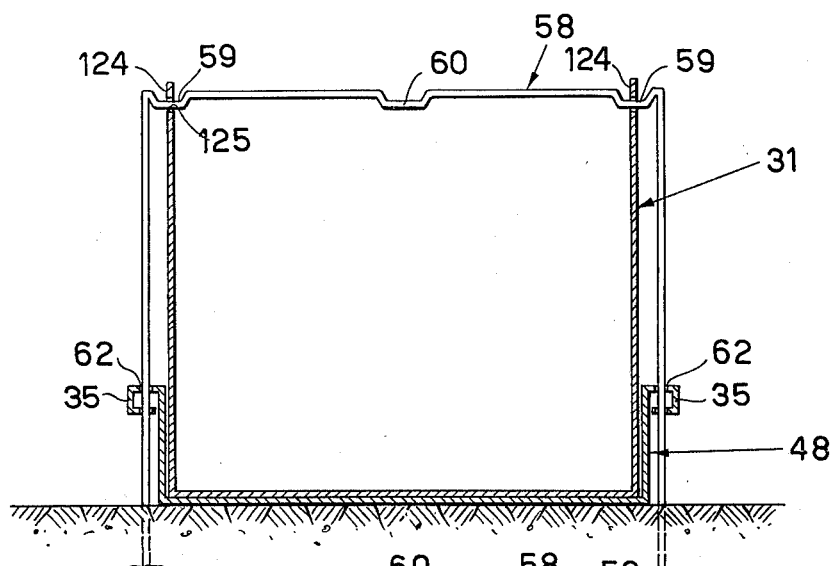
Figure 22:
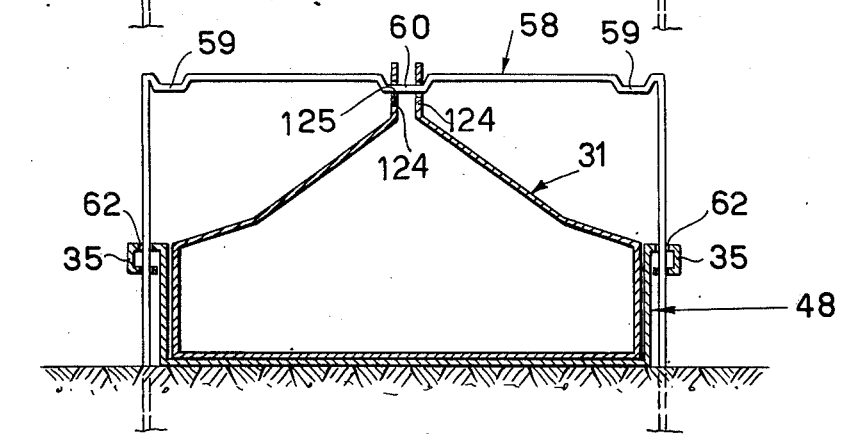

FIGS. 21 and 22 show an additional embodiment wherein the use is provided, in combination with the channel-like structure proper and the supporting channel 48, of a U-shaped metal stirrup 58, having two side grooves 59 which are symmetrical relative to a central groove 60.

As clearly shown, the stirrup 58 is adapted to be driven into the ground after having been passed through the bores 62 as formed through the side ridges 35 of the supporting channel 48, the latter being thus held in the preselected position.

Concurrently, the arms of the stirrup are also introduced into the bores 125 as formed through the stripes 124 of the channel-like structure. By so doing, the stripes themselves can be brought to the position of FIG. 21, wherein they are held by the grooves 59, thus permitting either the seedlings to be grown or the exploited plants to be removed, or also any other operation to be carried out in the interior of the channel-like structure, and also to the position of FIG. 22, wherein the strips aforesaid are held together by the groove 60 which fulfils the task of the union device 26.

Figure 23:
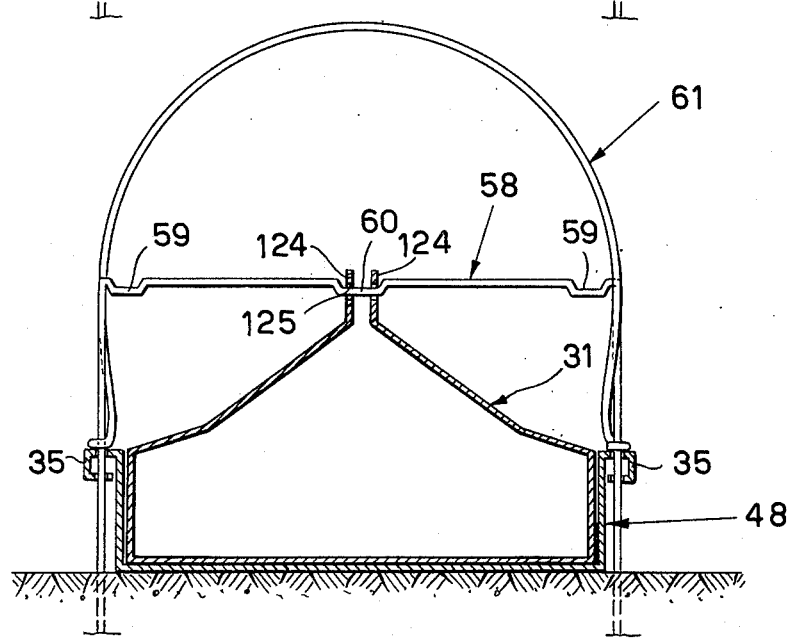
Figure 24:
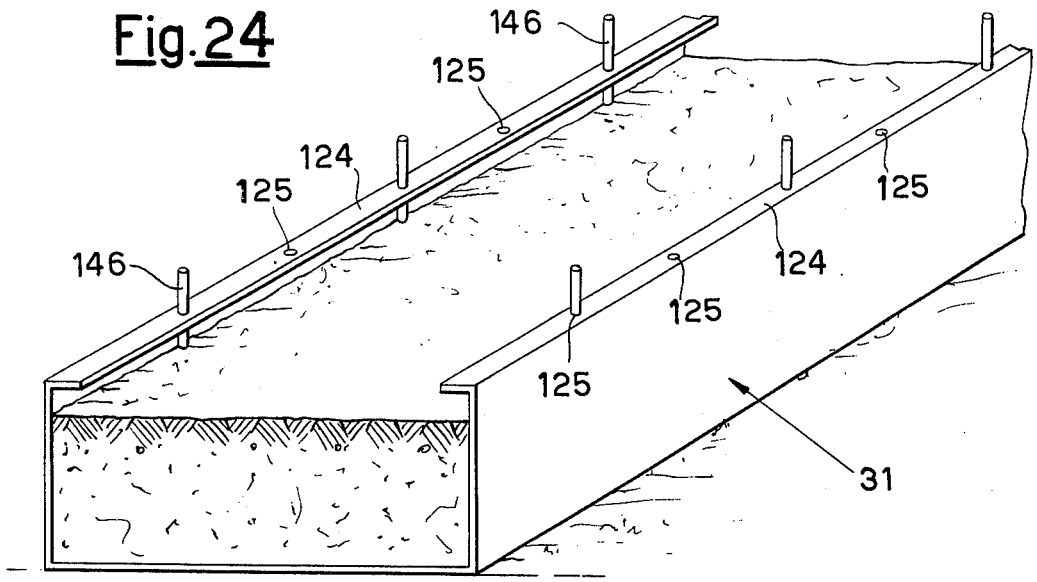
Figure 25:
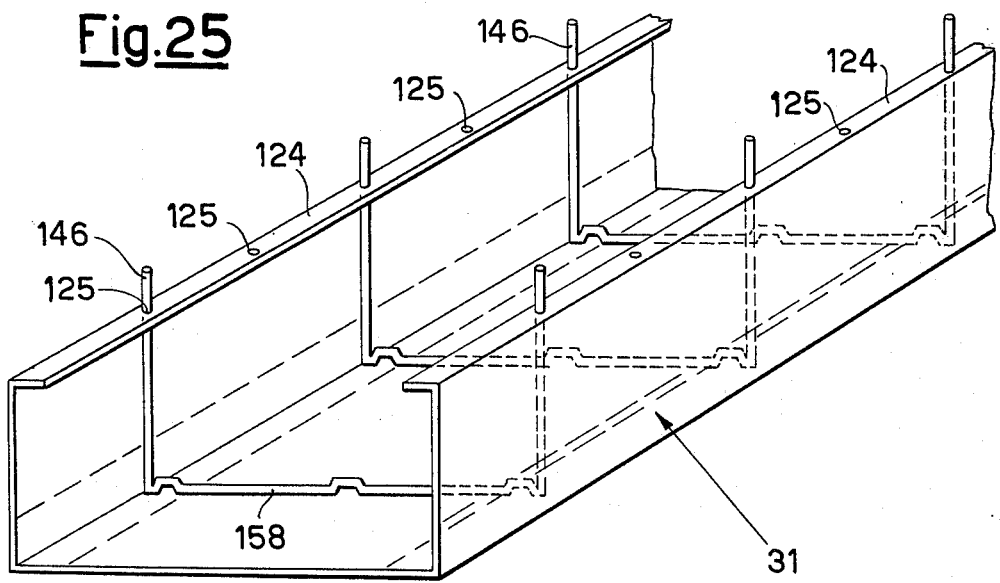

In the embodiment of FIG. 23 the stirrup 58 is associated with a second stirrup 61 which is substantially semicircular and the ends of which are fastened, for example, snappingly to the two arms of the stirrup 58, the stirrup 61 being intended, for example, to support an awning of plastics material film (polyethylene etc.) for protecting those parts of the plants which are located outside the channel-like structure. Lastly FIGS. 24 and 25 show the case in which with the same channel-like structure and stirrups 158 similar to the stirrups 58 it is possible to make up channels intended to be filled with peat, for example, for special growths.

It is fitting, at this stage, to emphasize that in all of the embodiments and modifications as disclosed hereinabove, the use is provided, as indicated above, of a layer of a fibrous material.

According to the invention, a modification is also provided for said fibrous material layer, which consists in embedding in it one or more continuous wires, preferably parallel to the longitudinal centre line of the channel-like structure, the wires having a high tensile strength. Such a modification is exploited for the following purpose: once a production cycle is over, the interior or the channel-like structure must be thoroughly cleaned by removing debris, root cuttings and so forth which, of course, mainly stick to the fibrous material layer. It becomes thus necessary to remove the fibrous layer aforementioned from the channel-like structure and to replace it, or, as an alternative, to strip it of such debris to reuse it. This is conveniently carried out if the longitudinal wires mentioned above are present, or any member corresponding to them.

For example, the fibrous material could be anchored to a lattice-like substrate.

The channel-like structure shown in FIG. 26 is akin to those of the preceding embodiments, the only difference being that the shape is more exactly parallelepipedal, the principle of the two strips or side strips 213, terminated by the strips 214 having bores for mounting the removable closure clamps, remaining unaffected. This embodiment is particularly suited to the case where the seedlings to be grown are very short so that the adoption of a structure according to the embodiments disclosed hereinabove would involve initial difficulties for positioning the seedlings and, above all, in order to allow the stem and the leaves to grow outside the channel-like structure.

The embodiments shown in FIGS. 27 and 28 refer to the case in which, in order to achieve a maximum exploitation of the available space while concurrently obtaining an economy of material, all the channel-like structure while keeping the configuration of the cross-sectional outline unaltered, are embodied on a single base sheet of the desired size, the sidewalls of a structure being possibly used as the sidewalls of another structure. Stated another way, from a common supporting sheet 311 project vertical walls 312, from which the pliable strips 313 start, having along their edges 314 bores for the spot union as disclosed for the preceding embodiments. More particularly, with reference to the embodiment of FIG. 27, the walls 312 and 313 can be made integrally and rigidly vertically extending from the sheet 311, as is clearly shown in FIG. 27.

The latter embodiment is similar to that of FIG. 28 in which the common supporting sheet 411 has, fastened thereto, at regular intervals, members 463 having a cross-sectional outline which is roughly semicircular, the union to the supporting sheet 411 taking place very much in the direction of a generating line or along a narrow strip which is parallel to a generating line of the member 463, the adjoining free edges of two confronting members such as 463 being united together at regular intervals in very much the same way as for the previously described embodiments, so that a plurality of adjacent channel-like chambers is defined, between which channels 464 are obtained, these latter being intended to convey rainwater or condensed atmospherical moisture.

Although this has not been shown, it is intended that also in the embodiments of FIGS. 26, 27 and 28, the channel-like structures are equipped with means for feeding and dumping a nutrient solution and their bottom wall is lined with the fibrous material which is intended to anchor the plant roots.

What I claim is:

1. A channel-like structure for horticulture and flower-growing, of the kind in which the plants to be grown are arranged in the interior of a tubular member so that the roots are in continuous contact with liquid nutrient solution, characterized in that said structure comprises a central core of a plastic material adapted to form in use a channel-like member, two side strips of a non-rigid plastics material having their origin, each, from an edge of the central core, said side strips having such a width as to be able to be at least partially superposed to one another in correspondence with the central line of said channel-like member, the inner surface of said central core forming the bottom wall of said structure is lined by a layer of a fibrous material.

2. A channel-like structure according to claim 1, characterized in that said central core is of a thermoplastics material.

3. A channel-like structure according to claim 1, characterized in that said fibrous layer is a felt or an unwoven fabric.

4. A channel-like structure according to claim 1, characterized in that at each end, in the working position, a portion of the bottom portion is curled upwards in order to close the hollow space as provided by said central core.

5. A channel-like structure according to claim 1, wherein a continuous thread-like member is anchored to the fibrous layer along the entire length thereof.

6. A channel-like structure for horticulture and flower-growing, of the kind in which the plants to be grown are arranged in the interior of a tubular member so that the roots are in continuous contact with liquid nutrient solution, characterized in that said structure comprises a central core of a plastic material adapted to form in use a channel-like member, two side strips of a non-rigid plastics material having their origin, each, from an edge of the central core, said side strips having such a width as to be able to be at least partially superposed to one another in correspondence with the central line of said channel-like member, said central core being constituted by a strip forming the bottom wall of the structure, from which two substantially vertical sidewalls start, said strip being of a semi-rigid plastics material and having previously moulded longitudinal folding lines.

7. A channel-like structure according to claim 6 wherein said strip is initially formed as a tube.

8. A channel-like structure according to claim 6 wherein said strip is initially formed as a tube, said tube being flattened to form said bottom wall, a plurality of folded sidewall panels overlying opposite edge portions of said bottom wall, and said tube being slit to define a divided upper base overlying said bottom wall and said sidewall panels.

9. A channel-like structure according to claim 8 together with means for securing together adjacent edge portions of said upper base in spaced generally parallel relation.

10. A channel-like structure for horticulture and flower-growing, of the kind in which the plants to be grown are arranged in the interior of a tubular member so that the roots are in continuous contact with liquid nutrient solution, characterized in that said structure comprises a central core of a plastic material adapted to form in use a channel-like member, two side strips of a non-rigid plastics material having their origin, each, from an edge of the central core, said side strips having such a width as to be able to be at least partially superposed to one another in correspondence with the central line of said channel-like member, said central core and said side strips being provided as a single piece in the form of a tubular member of a plastics material open along a generating line, said tubular member having at least a crease on two opposite sides intended to form the flanks of the channel-like structure, the confronting edges of said longitudinal opening having matching bores which are spaced apart according to a preselected pattern along the length of said edges.

11. A channel-like structure according to claim 10, characterized in that said creases are at least twin-creases.

12. A channel-like structure according to claim 10, characterized in that said tubular member is formed from a strip of a plastics material having preselected folding lines thereon.

13. A channel-like structure according to claim 12, characterized in that said strip is obtained by laminating two plastic sheets, at least one of which is of a colour adapted to reflect the U.V. rays as much as possible.

14. A channel-like structure according to claim 10, characterized in that said channel-like structure has a parallelepipedal shape when in its working position.

15. A channel-like structure for horticulture and flower-growing, of the kind in which the plants to be grown are arranged in the interior of a tubular member so that the roots are in continuous contact with liquid nutrient solution, characterized in that said structure comprises a central core of a plastic material adapted to form in use a channel-like member, two side strips of a non-rigid plastics material having their origin, each, from an edge of the central core, said side strips having such a width as to be able to be at least partially superposed to one another in correspondence with the central line of said channel-like member, and terminal members mounted at the ends of the channel-like structure, each terminal member being formed by a stiff channel closed on three sides and so sized as to contain with a small preselected clearance said channel-like structure of plastics material, at least one of said terminal members having a discharge port.

16. A channel-like system according to claim 15, characterized in that the side upper edges of each supporting channel are curled both outwards and downwards, thus providing an open quadrangular cross-sectional outline.

17. A channel-like system according to claim 15, especially adapted for being installed in a raised position above the ground, characterized in that said structure is supported along its length by a supporting channel having a cross-sectional outline identical to that of the terminal members.

18. A channel-like system according to claim 17, characterized in that said supporting channel has at its two ends a flange which projects vertically downward from the base surface of the supporting channel.

19. A channel-like system according to claim 18, including supporting members having arms provided with slots adapted to receive the downward projecting flange portions of the supporting channels.

20. A channel-like system according to claim 19, characterized in that the height of said arms above the ground level is adjustable.

21. A channel-like structure according to claim 17 characterized in that for anchoring both the channel-like structure and its supporting channel to a supporting plane, U-shaped stirrups are provided which are adapted to pass through bores formed through the edges of the channel-like structure and through bores formed through said borderline side edges of the supporting channel.

22. A channel-like system according to claim 21, characterized in that said stirrups are formed by a stiff wire and the base side of the U has a central groove and two grooves symmetrical relative to said central groove.

23. A channel-like system according to claim 15, characterized in that, in the working position, the two end edges of each channel-like structure section are curled upwards to close the channel-like portion proper of the structure.

24. A channel-like system according to claim 15, characterized in that the discharge port is protected by a removable dome-shaped grid.

25. A channel-like structure for horticulture and flower-growing, of the kind in which the plants to be grown are arranged in the interior of a tubular member so that the roots are in continuous contact with liquid nutrient solution, characterized in that said structure comprises a central core of a plastic material adapted to form in use a channel-like member, two side strips of a non-rigid plastics material having their origin, each, from an edge of the central core, said side strips having such a width as to be able to be at least partially superposed to one another in correspondence with the central line of said channel-like member, said core being a portion of a single common supporting sheet, from which sidewalls rise, along the free edges whereof side strips which can be connected at short intervals, the sidewalls being common to two adjacent channel-like structures.

26. A channel-like structure according to claim 25, characterized in that said sidewalls and said pliable strips are made in the form of elements having a half-tubular sectional outline, affixed to said common supporting sheet along a generating line thereof.

27. A channel-like structure for horticulture and flower-growing, of the kind in which the plants to be grown are arranged in the interior of a tubular member so that the roots are in continuous contact with liquid nutrient solution, characterized in that said structure comprises a central core of a plastic material adapted to form in use a channel-like member, two side strips of a non-rigid plastics material having their origin, each, from an edge of the central core, said side strips having such a width as to be able to be at least partially superposed to one another in correspondence with the central line of said channel-like member, said structure being provided in coil strip form.

28. A channel-like structure according to claim 27, characterized in that the central core has previously moulded longitudinal folding lines.

* * * * *